United States Patent
Harada et al.

(10) Patent No.: US 7,607,301 B2
(45) Date of Patent: Oct. 27, 2009

(54) EXHAUST GAS HEAT EXCHANGER, EXHAUST GAS RECIRCULATION SYSTEM, AND EXHAUST GAS HEAT EXCHANGING METHOD

(75) Inventors: Masaki Harada, Kariya (JP); Haruhiko Watanabe, Chiryu (JP)

(73) Assignee: Denso Corporation, Kariya (JP)

( * ) Notice: Subject to any disclaimer, the term of this patent is extended or adjusted under 35 U.S.C. 154(b) by 3 days.

(21) Appl. No.: 11/501,530

(22) Filed: Aug. 9, 2006

(65) Prior Publication Data

US 2007/0044469 A1    Mar. 1, 2007

(30) Foreign Application Priority Data

Aug. 30, 2005    (JP)    ............... 2005-250068

(51) Int. Cl.
*F02B 33/44* (2006.01)
*F02M 25/07* (2006.01)
*F01N 5/02* (2006.01)

(52) U.S. Cl. ............ 60/605.2; 123/568.12; 123/568.17; 165/51

(58) Field of Classification Search ................ 60/605.2; 123/568.12, 568.17; 165/51; F02M 25/07
See application file for complete search history.

(56) References Cited

U.S. PATENT DOCUMENTS

| | | | | |
|---|---|---|---|---|
| 5,915,619 | A * | 6/1999 | Etheve | ......................... 165/51 |
| 6,330,910 | B1 * | 12/2001 | Bennett | ......................... 165/51 |
| 6,427,436 | B1 * | 8/2002 | Allansson et al. | ........... 60/605.2 |
| 7,159,393 | B2 | 1/2007 | Blomquist et al. | ............ 60/302 |
| 7,189,374 | B1 * | 3/2007 | Hawker | ................. 123/568.12 |
| 7,210,469 | B1 * | 5/2007 | Saele | ........................ 60/605.2 |
| 7,243,495 | B2 * | 7/2007 | Whelan et al. | ............. 60/605.2 |
| 2004/0112345 | A1 * | 6/2004 | Bertilsson et al. | ...... 123/568.17 |

FOREIGN PATENT DOCUMENTS

| | | | |
|---|---|---|---|
| CN | 1576539 | | 2/2005 |
| DE | 10 2004 013 206 A1 * | | 10/2005 |
| GB | 2316445 A * | | 2/1998 |
| JP | 08135517 A * | | 5/1996 |
| JP | 10169514 A * | | 6/1998 |
| JP | 2000027715 | | 1/2000 |
| JP | 2005248777 | | 9/2005 |
| WO | WO 2004044402 A1 * | | 5/2004 |

OTHER PUBLICATIONS

Machine Translation of JP 200-027715 A.*
Office action dated Mar. 14, 2008 in Chinese Application No. 2006 10121354.7 with English translation thereof.

* cited by examiner

Primary Examiner—Thai Ba Trieu
(74) Attorney, Agent, or Firm—Harness, Dickey & Pierce, PLC

(57) ABSTRACT

In an exhaust gas heat exchanger for a system where a compressing means is located upstream of an internal combustion engine, and a part of exhaust gas from the internal combustion engine flows into the intake gas at a merge part located upstream of the compressing means, the exhaust gas heat exchanger includes a heat exchanging member. The heat exchanging member is provided adjacently to the merge part, and exchanges heat between the intake gas and the part of the exhaust gas such that the part of the exhaust gas is cooled by the intake gas.

9 Claims, 4 Drawing Sheets

EXHAUST GAS HEAT EXCHANGER, EXHAUST GAS RECIRCULATION SYSTEM, AND EXHAUST GAS HEAT EXCHANGING METHOD

CROSS REFERENCE TO RELATED APPLICATION

This application is based on and incorporates herein by reference Japanese Patent Application No. 2005-250068 filed on Aug. 30, 2005.

BACKGROUND OF THE INVENTION

1. Field of the Invention

The present invention relates to an exhaust gas heat exchanger, an exhaust gas recirculation system having the exhaust gas heat exchanger, and an exhaust gas heat exchanging method.

2. Description of Related Art

Conventionally, for example, an exhaust gas recirculation system shown in FIG. 8 is known as a method to reduce nitrogen oxides (NOx) in exhaust gas from an internal combustion engine (specifically, diesel engine).

In this exhaust gas recirculation system 1a, intake gas is compressed (supercharged) by a turbocharger 20 and is cooled by an intercooler 30. Then, the intake gas flows into an internal combustion engine 10. Exhaust gas that outflows from the internal combustion engine 10 is discharged to an atmosphere after going through an after treatment apparatus 40. However, a part of the exhaust gas recirculates into the intake gas. In this case, there is no need for compressing the exhaust gas (i.e., no need for energy consumption by a compressing means), because the part of the exhaust gas flows into the intake gas on an upstream (low pressure side) of the turbocharger 20. Thus, fuel economy of the internal combustion engine 10 is limited from deteriorating.

However, in the above exhaust gas recirculation system 1a, nitric acid and sulfuric acid are generated when the NOx and sulfur oxides (SOx) in the exhaust gas are condensed. Thus, there is a fear of causing corrosion to the intercooler 30 and the turbocharger 20.

SUMMARY OF THE INVENTION

The present invention is made in view of the above disadvantages. Thus, it is an objective of the present invention to address at least one of the above disadvantages.

To achieve the objective of the present invention, there is provided an exhaust gas heat exchanger for a system where a compressing means for compressing intake gas is located upstream of an internal combustion engine, and a part of exhaust gas discharged from the internal combustion engine flows into the intake gas at a merge part located upstream of the compressing means, the exhaust gas heat exchanger including a heat exchanging member. The heat exchanging member is provided adjacently to the merge part, wherein the heat exchanging member exchanges heat between the intake gas and the part of the exhaust gas such that the part of the exhaust gas is cooled by the intake gas.

To achieve the objective of the present invention, there is also provided an exhaust gas recirculation system, which includes a compressing means, a cooling heat exchanger, an internal combustion engine, and an exhaust gas heat exchanger. The compressing means compresses intake gas. The cooling heat exchanger cools the intake gas, which is compressed by the compressing means. The internal combustion engine, to which the intake gas cooled by the cooling heat exchanger is introduced, wherein a part of exhaust gas discharged from the internal combustion engine flows into the intake gas at a merge part located upstream of the compressing means. The exhaust gas heat exchanger is provided adjacently to the merge part, wherein the exhaust gas heat exchanger exchanges heat between the intake gas and the part of the exhaust gas, which is discharged from the internal combustion engine, such that the part of the exhaust gas is cooled by the intake gas.

To achieve the objective of the present invention, there is also provided an exhaust gas heat exchanging method. In the method, a part of exhaust gas discharged from an internal combustion engine is introduced into an exhaust gas heat exchanger provided adjacently to an intake pipe, through which intake gas flows to the internal combustion engine. Heat is exchanged between the intake gas and the part of the exhaust gas by use of the exhaust gas heat exchanger such that the part of the exhaust gas is cooled by the intake gas. The part of the exhaust gas, which is cooled by the exchanging of the heat, is introduced into the intake gas at a merge part in the intake pipe.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

First Embodiment

An embodiment of an exhaust gas heat exchanger 100 of the present embodiment, which is applied to an exhaust gas recirculation system 1, will be described with reference to FIGS. 1 and 2.

Figure 1:
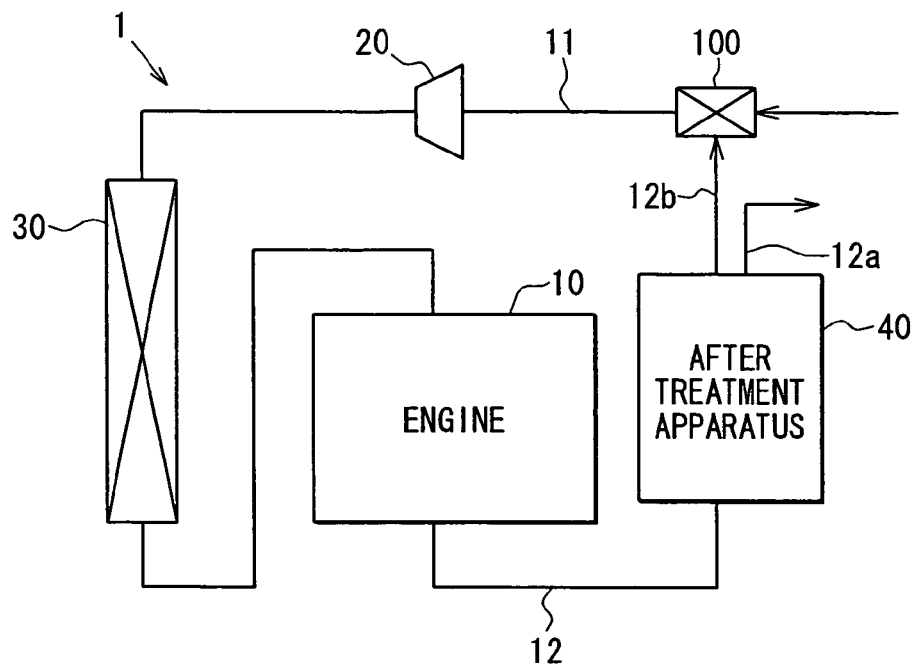
FIG. 1 is a schematic diagram showing an exhaust gas recirculation system.
Figure 2:
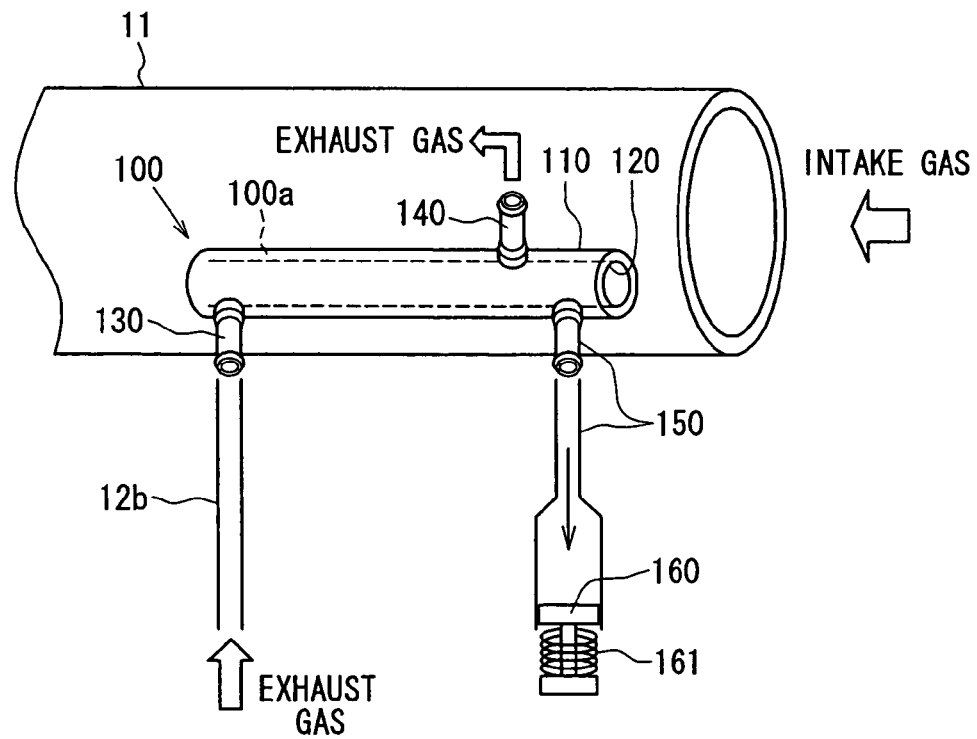
FIG. 2 is an outline drawing of an exhaust gas heat exchanger according to a first embodiment.

As shown in FIG. 1, the exhaust gas recirculation system 1 includes an engine 10, which is a drive source for a vehicle travel, and later-described various apparatuses 20, 30, 40, 100. The engine 10 is, for example, a diesel engine and corresponds to an internal combustion engine of the present invention. The engine 10 is connected to an intake pipe 11 and an exhaust pipe 12, to which the various apparatuses 20, 30, 40, 100 are provided.

Intake gas is introduced into cylinders of the engine 10 through the intake pipe 11. Exhaust gas, which is generated after the intake gas is combusted in the cylinders, is discharged through the exhaust pipe 12.

A turbocharger (corresponding to a compressing means in the present invention) 20 is provided to the intake pipe 11. The turbocharger 20 includes a turbine and a compressor member. The turbine is rotated by pressure energy of the exhaust gas and the compressor member, which is directly connected to the turbine and work with the turbine, compresses (supercharges) the intake gas. Further, an intercooler 30 (corresponding to a cooling heat exchanger in the present invention) is provided in the intake pipe 11 between the turbocharger 20 and the engine 10. The intercooler 30 cools the compressed intake gas.

The intercooler 30 is made of aluminum and includes a heat exchanging member, which has tubes and fins. A cross section of each tube is formed into a flat shape and multiple flat tubes are laminated. Also, each fin is formed into a wavy shape and is located between the multiple tubes. The intake gas circulates inside the tubes of the intercooler 30. Outdoor air, which is introduced from a front side of a vehicle, circulates around the tubes and fins such that the intake gas is cooled by the outdoor air.

An after treatment apparatus 40 is provided in the exhaust pipe 12 such that particulate matters (PM) in the exhaust gas, for example, are removed. The exhaust pipe 12 is separated into an exhaust pipe 12a for atmosphere and a merging exhaust pipe 12b in the downstream of the after treatment apparatus 40. The exhaust pipe 12a for the atmosphere opens to the atmosphere. The merging exhaust pipe 12b is connected to the intake pipe 11 on the upstream of the turbocharger 20 such that the exhaust gas merges with the intake gas on an intake side of the turbocharger 20. A part of the exhaust gas merges into the intake pipe 11 to be mixed with the intake gas in response to, for example, a rotational speed and a load of the engine 10.

Then, an exhaust gas heat exchanger 100 is located in a merge part, where the exhaust gas merges (flows) into the intake gas.

The exhaust gas heat exchanger 100 is a double-tube heat exchanger made of a stainless material, which has excellent corrosion resistance. As shown in FIG. 2, a main body of the exhaust gas heat exchanger 100 includes an outer tube 110 and an inner tube 120, which is inserted into the outer tube 110. Both longitudinal ends of each of the outer tube 110 and the inner tube 120 are correspondingly connected with each other such that an interpassage 100a for an exhaust gas flow is defined between the outer tube 110 and the inner tube 120. Here, the interpassage 100a serves as a heat exchanging member of the present invention. An inflow pipe (inflow tube) 130 is connected with one longitudinal end side of the outer tube 110 such that inflow pipe 130 communicates with the interpassage 100a. Also, an outflow pipe (outflow tube) 140 is connected with another longitudinal end side of the outer tube 110 such that the outflow pipe 140 communicates with the interpassage 100a.

A discharge pipe (discharge passage of the present invention) 150 is provided at a lower end of a longitudinally opposite end side of the outer tube 110, which is opposite from the inflow pipe 130 such that the discharge pipe 150 communicates with and extends downwardly from the interpassage 100a. A lower end of the discharge pipe 150 is expanded and opens downwardly. A valve (corresponding to an on-off valve of the present invention) is provided to a lower end open portion of the discharge pipe 150.

The valve 160 opens and closes the lower end open portion of the discharge pipe 150, and the valve 160 normally closes the lower end open portion due to a bias force (an upward force in FIG. 2) of a spring 161, which is provided to a lower side of the valve 160. As described later, when a condensate, which is generated (condensed) by cooling the exhaust gas, is stored by a predetermined amount in the discharge pipe 150, a weight of the condensate exceeds the bias force of the spring 161 to push downwardly the valve 160. Thus, the lower end open portion of the discharge pipe 150 is opened.

The main body of the exhaust gas heat exchanger 100 is located inside the intake pipe 11 such that a longitudinal axis of the main body extends along a longitudinal axis of the intake pipe 11. An end portion of the inflow pipe 130 extends to an outside of the intake pipe 11 and is connected with the merging exhaust pipe 12b. Also, an end of the outflow pipe 140 opens inside the intake pipe 11. The lower end open portion of the discharge pipe 150 and the valve 160 are located outside of the intake pipe 11.

Inner fins may be located in the interpassage 100a of the exhaust gas heat exchanger 100. Here, the inner fins improve heat conductivity of the exhaust gas side of the interpassage 100a.

Explanations will be made for operations and effects of the above-structured exhaust gas recirculation system 1 and exhaust gas heat exchanger 100.

The intake gas (i.e., mixture gas that includes a part of the exhaust gas as described later), which is delivered through the intake pipe 11, is compressed (supercharged) by the turbocharger 20 and is further cooled by the intercooler 30. Then, the intake gas is introduced into the cylinders of the engine 10 to be combusted in a combustion chamber.

At this time, because the intake gas (the mixture gas) is compressed (supercharged) by the turbocharger 20, an amount of the intake gas (the mixture gas) is increased, thereby increasing an output of the engine 10. Also, because the intake gas is compressed by the turbocharger 20, the temperature of the intake gas is increased such that a density of the intake gas is decreased. However, the intake gas is cooled by the intercooler 30 so that the deterioration of the output of the engine 10 is limited.

Then, the exhaust gas, which is generated after the intake gas is combusted in the combustion chamber, flows through the exhaust pipe 12. Then, the after treatment apparatus 40 purifies the exhaust gas (removes the PM in the exhaust gas), and a most part of the exhaust gas is discharged to the atmosphere through the exhaust pipe 12a for the atmosphere. Also, the part of the exhaust gas, which is treated by the after treatment apparatus 40, flows into the exhaust gas heat exchanger 100 through the merging exhaust pipe 12b by an adjusted amount in relation to the rotational speed and load of the engine 10. After passing through the exhaust gas heat exchanger 100, the exhaust gas is mixed with the intake gas in the intake pipe 11.

In other words, the part of the exhaust gas circulates into the interpassage 100a through the inflow pipe 130, and then circulates into the intake pipe 11 through outflow pipe 140. Then, the exhaust gas is mixed with the intake gas, and the mixed gas is introduced into the engine 10 as descried above. Because the exhaust gas is mixed with the intake gas, the combustion temperature in the combustion chamber of the engine 10 is decreased such that a generation amount of the NOx is reduced (i.e., NOx reduction effect of the exhaust gas recirculation system 1).

In the exhaust gas heat exchanger 100, the intake gas in the intake pipe 11 circulates around the outer tube 110 and inside the inner tube 120 of the heat exchanger 100. Thus, the intake gas and the exhaust gas, which flows through the interpassage 100a, exchange the heat such that the exhaust gas, the temperature of which is higher than that of the intake gas, is cooled by the intake gas.

Because the exhaust gas is cooled, the NOx and the SOx in the exhaust gas are condensed to generate nitric acid and sulfuric acid as condensate. The condensate (the nitric acid, the sulfuric acid) flows through the discharge pipe 150 and is stored in the expanded part at the lower side of the discharge pipe 150. When the predetermined amount of the condensate is stored, the valve is opened due to the weight of the condensate such that the condensate is discharged to the atmosphere.

As above, in the exhaust gas recirculation system 1, because the exhaust gas heat exchanger 100 is located at the connection (merge part), where the exhaust gas merges with (flows into) the intake gas, the exhaust gas is cooled by the intake gas. Thus, the NOx and SOx in the exhaust gas can be condensed as the nitric acid and the sulfuric acid such that the corrosion is limited from occurring to associated devices, for example, the turbocharger 20 and the intercooler 30, which are located on the downstream side of the heat exchanger 100.

Also, because the exhaust gas heat exchanger 100 is located inside the intake pipe 11, a heat exchange area between the intake gas and the exhaust gas can be substantially obtained such that the heat exchangeability of the exhaust gas heat exchanger 100 can be improved.

Also, because the discharge pipe 150 is provided to the exhaust gas heat exchanger 100, the condensate (the nitric acid, the sulfuric acid) generated by cooling the exhaust gas can be discharged to the outside of the heat exchanger 100 due to the own weight of the condensate. Thus, the corrosion is limited from occurring to the exhaust gas heat exchanger 100.

Because the valve 160 is provided to the discharge pipe 150, the condensate can be automatically discharged to the outside of the discharge pipe 150 every time the predetermined amount of the condensate is stored in the discharge pipe 150. That is, this can avoid a trouble for a drive to recover (treat) the condensate.

Second Embodiment

Figure 3:
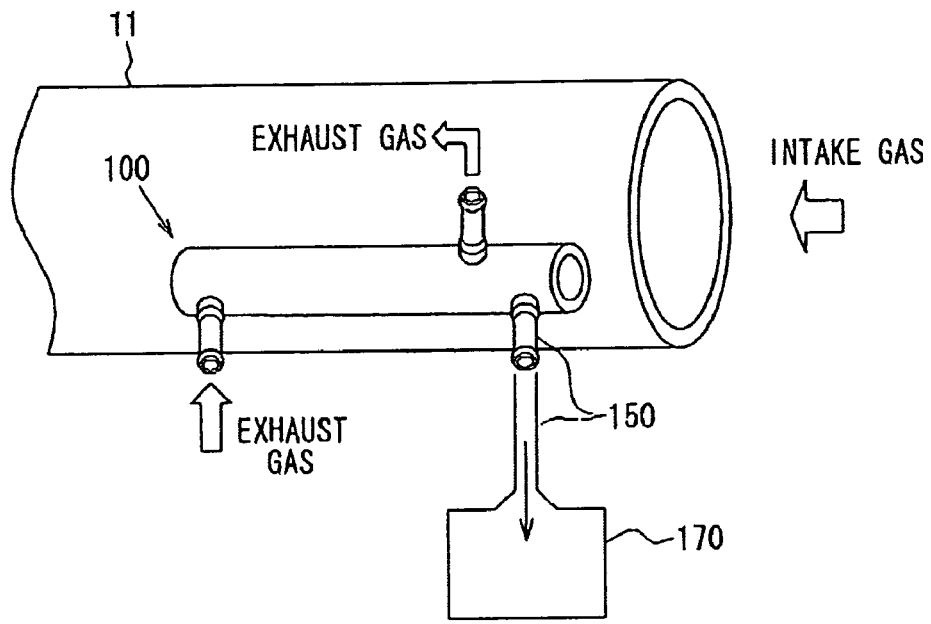
FIG. 3 is an outline drawing of an exhaust gas heat exchanger according to a second embodiment.

A second embodiment of the present invention is shown in FIG. 3. Similar components of an exhaust gas heat exchanger and an exhaust gas recirculation system of the present embodiment, which are similar to the components of the exhaust gas heat exchanger and the exhaust gas recirculation system of the first embodiment, will be indicated by the same numerals. In the second embodiment, a storing member 170, which has a predetermined volume, is provided to a lower end side of the discharge pipe 150 of the exhaust gas heat exchanger 100 in place of the valve 160 in the first embodiment. Here, the discharge pipe 150 is a straight pipe, which does not includes the expanded portion at the lower end side thereof.

Thus, the condensate (the nitric acid, the sulfuric acid) can be regularly removed through the storing member 170 by the driver. Therefore, a predetermined treatment can be applied.

Third Embodiment

Figure 4:
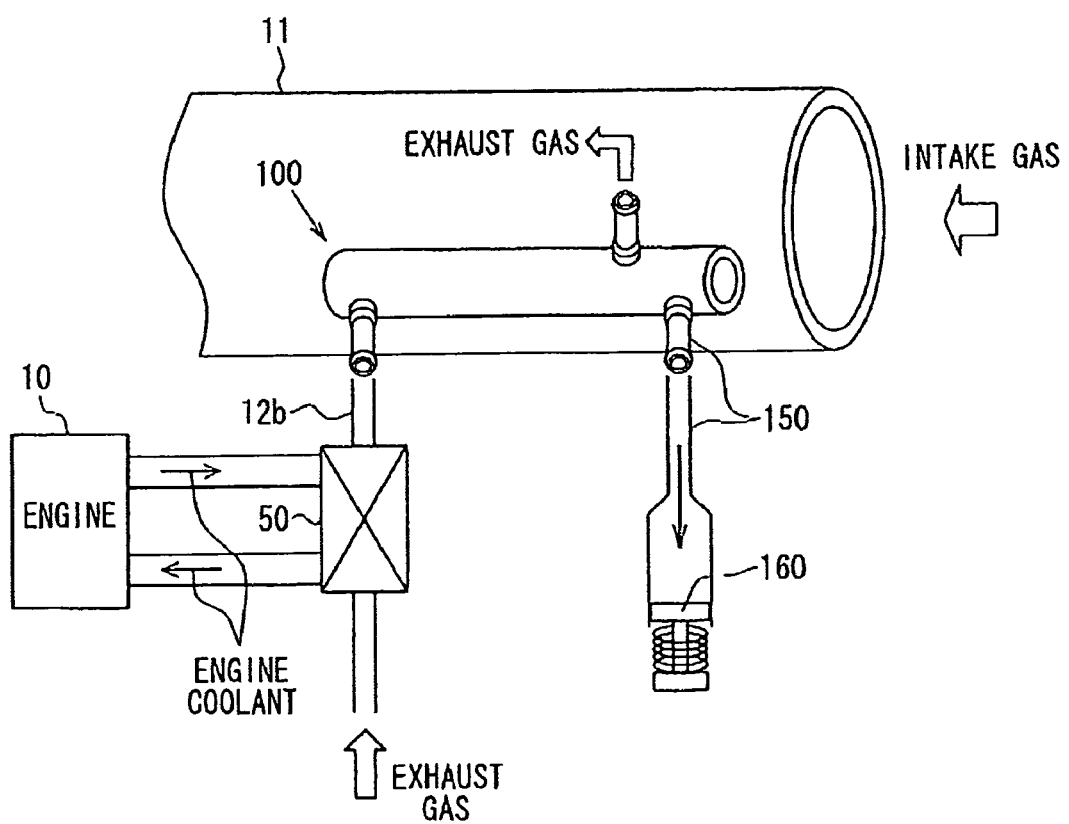
FIG. 4 is a schematic diagram of an exhaust gas recirculation (EGR) gas cooler, which is added to an exhaust gas recirculation system according to a third embodiment.

A third embodiment of the present invention is shown in FIG. 4. Similar components of an exhaust gas heat exchanger and an exhaust gas recirculation system of the present embodiment, which are similar to the components of the exhaust gas heat exchanger and the exhaust gas recirculation system of the first embodiment, will be indicated by the same numerals. When compared to the first embodiment, in the third embodiment, an exhaust gas recirculation (EGR) gas cooler (corresponding to an exhaust gas cooling heat exchanger of the present invention) 50 is provided to the merging exhaust pipe 12b, which is connected to an exhaust gas inflow side of the exhaust gas heat exchanger 100.

The EGR gas cooler 50 is, for example, a shell and tube heat exchanger, which is made of a stainless material. Multiple tubes for the exhaust gas stream are placed in an outer tube (shell), and coolant for cooling the engine 10 circulates around the multiple tubes inside the outer shell. Here, the EGR gas cooler 50 is not limited to the above shell and tube heat exchanger, but may be an air cooled heat exchanger, like the intercooler 30.

Thus, because the exhaust gas can be cooled beforehand at the upstream of the exhaust gas heat exchanger 100, the temperature of the intake gas is limited from increasing when the exhaust gas is mixed with the intake gas. Thus, the density of the mixed gas is limited from decreasing such that the compression efficiency of the turbocharger 20 can be improved.

Fourth Embodiment

Figure 5:
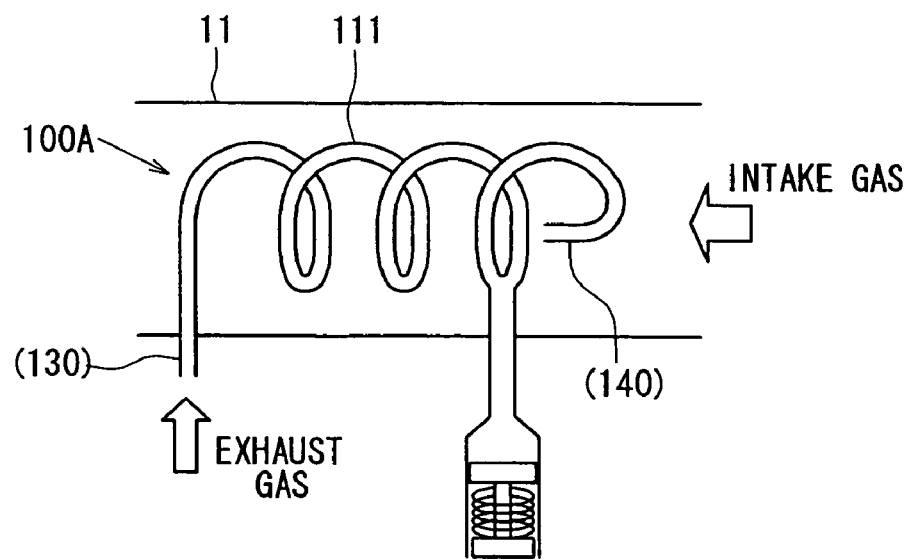
FIG. 5 is an outline drawing of an exhaust gas heat exchanger according to a fourth embodiment.

A fourth embodiment of the present invention is shown in FIG. 5. Similar components of an exhaust gas heat exchanger and an exhaust gas recirculation system of the present embodiment, which are similar to the components of the exhaust gas heat exchanger and the exhaust gas recirculation system of the first embodiment, will be indicated by the same numerals. In the fourth embodiment, a structure of a main body of an exhaust gas heat exchanger 100A is changed from that of the first embodiment. In other words, an exhaust gas passage 111, which is formed into a spiral single tube, may alternatively serve as the main body of the exhaust gas heat exchanger 100A, instead of the double tube structure. Here, one end of the exhaust gas passage 111 corresponds to the inflow pipe (inflow tube) 130 for the exhaust gas, and another end of the exhaust gas passage 111 corresponds to the outflow pipe (outflow tube) 140 for the exhaust gas. Thus, the exhaust gas heat exchanger 100A can be made inexpensively.

Figure 6:
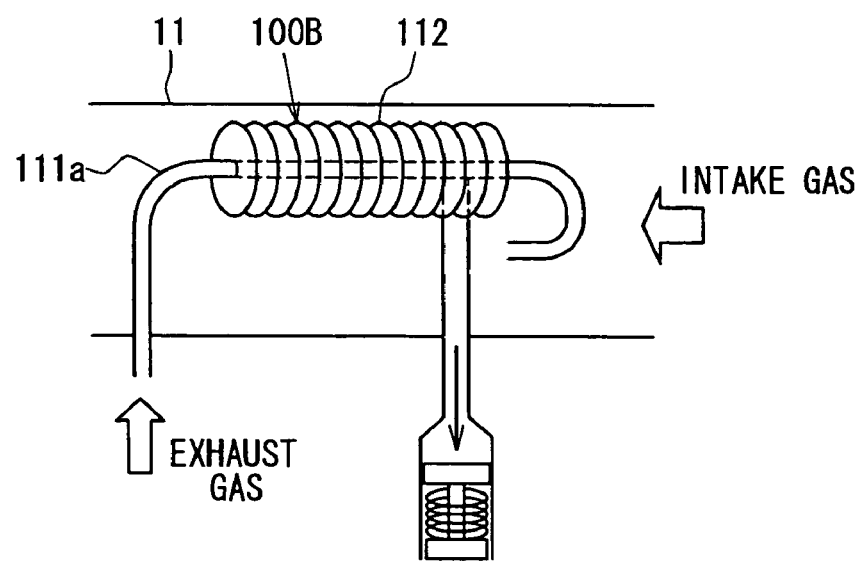
FIG. 6 is an outline drawing of an exhaust gas heat exhaust according to a first modification of a fourth embodiment.
Figure 7:
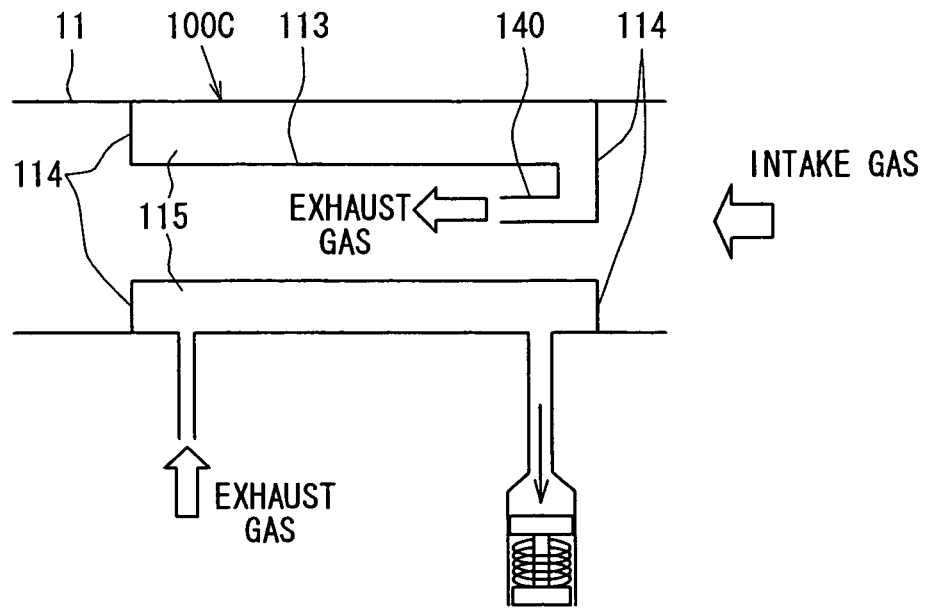
FIG. 7 is an outline drawing of an exhaust gas heat exchanger according to a second modification of a fourth embodiment.
Figure 8:
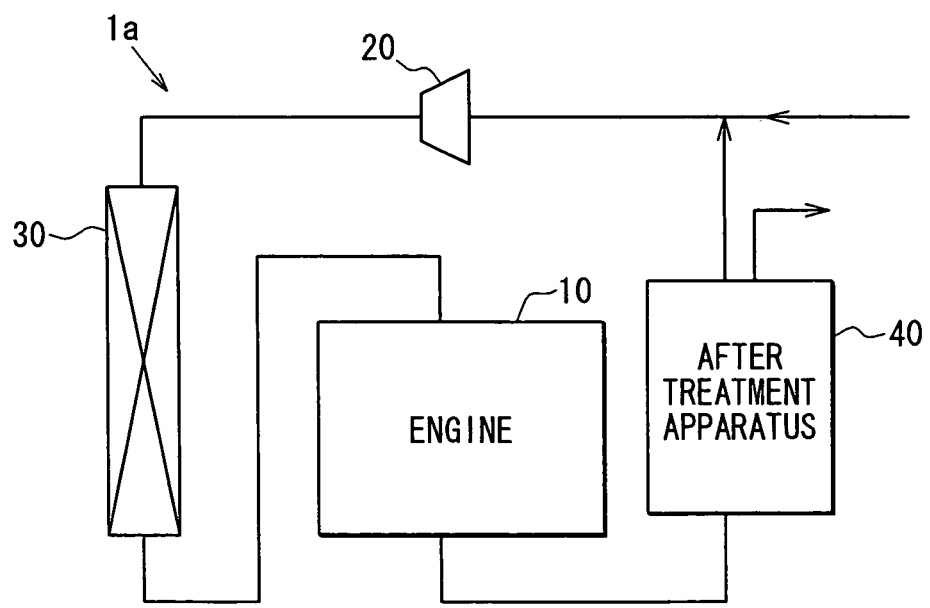
FIG. 8 is a schematic diagram of an exhaust gas recirculation system according to a related art.

Other possible exhaust gas heat exchangers 100 are shown in FIGS. 6, 7. An exhaust gas heat exchanger 100B shown in FIG. 6 includes an exhaust gas passage 111a, which has a straight tube as the main body, and multiple thin disk-shaped fins 112, which are provided to an outer peripheral of the exhaust gas passage 111a. Each of the above exhaust gas passages 111, 111a corresponds to the heat exchanging member of the present invention.

Also, an exhaust gas heat exchanger 100C shown in FIG. 7 includes an exhaust gas passage 115, which has a part of the intake pipe 11, a tubular member 113 located inside the part of the intake pipe 11 and blockade members 114. Here, the exhaust gas passage 115 corresponds to the heat exchanging member of the present invention. Each blockade member 114 closes an opening space between the intake pipe 11 and a corresponding longitudinal end of the tubular member 13 such that the exhaust gas passage 115 is defined. Here, the outflow pipe 140 is formed such that the outflow pipe 140 opens toward a space defined inside the tubular member 113 as shown in FIG. 7. In the exhaust gas heat exchanger 100C, the intake gas circulate inside the tubular member 113 and the exhaust gas circulates in the space defined between the intake pipe 11 and the tubular member 113 such that the heat can be exchanged between the intake gas and the exhaust gas.

Other embodiment will be described. In each of the above embodiments, the exhaust gas heat exchangers 100, 100A to 100C are described to be located inside the intake pipe 11. However, they are not limited to this. The exhaust gas heat exchanger may be alternatively located outside the intake pipe 11 such that the heat exchanger contacts an outer surface of the intake pipe 11 or is located adjacently to the intake pipe 11.

Also, the discharge pipe 150 is described to include the valve 160 or the storing member 170 at the lower end side of the discharge pipe 150. However, the discharge pipe 150 may be simply structured to open to the atmosphere instead of having the valve 160 or the storing member 170. In this case, the condensate, which is generated by cooling the exhaust gas, is discharged through the discharge pipe 150 any time.

In the above embodiments, the turbocharger 20 serves as the compressing means of the present invention. However, other compressing devices, which are familiar to a person skilled in the art, for example, a mechanical supercharger, may alternatively serve as the compressing means.

Additional advantages and modifications will readily occur to those skilled in the art. The invention in its broader terms is therefore not limited to the specific details, representative apparatus, and illustrative examples shown and described.

What is claimed is:

1. An exhaust gas heat exchanger for a system where means for compressing intake air-gas mixture is located upstream of an internal combustion engine and a part of exhaust gas discharged from the internal combustion engine flows into the intake air-gas mixture upstream of the compressing means, the exhaust gas heat exchanger comprising:
   a heat exchanging member defining an internal passage through which the part of the exhaust gas flows, the heat exchanging member being disposed within an intake pipe through which the intake air-gas mixture flows;
   an inflow pipe attached to the heat exchanging member, the inflow pipe introducing the part of the exhaust gas into the internal passage;
   an outflow pipe attached to the heat exchanging member, the outflow pipe introducing the part of the exhaust gas from the internal passage into the inflow pipe; and
   a discharge pipe attached to the heat exchanging member, the discharge pipe extending through the inflow pipe to discharge a condensate from the internal passage; wherein
   the heat exchanging member exchanges heat between the part of the exhaust gas in the internal passage and the intake air-gas mixture flowing across an outer surface of the heat exchanging member.

2. The exhaust gas heat exchanger according to claim 1, further comprising:
   an exhaust gas cooling heat exchanger located upstream of the heat exchanging member, the exhaust gas cooling heat exchanger cooling the part of the exhaust gas by exchanging heat between the part of the exhaust gas and a coolant used for cooling the engine.

3. The exhaust gas heat exchanger according to claim 1, wherein:
   the discharge passage extends downwardly from a lower end portion of the passage to communicate with the exterior.

4. The exhaust gas heat exchanger according to claim 3, further comprising an on-off valve that is located at a lower end portion of the discharge pipe, wherein the on-off valve is opened and closed based on a weight of the condensate, which is generated when the part of the exhaust gas is cooled.

5. The exhaust gas heat exchanger according to claim 3, further comprising a storing member that is located at a lower end portion of the discharge pipe, wherein the storing member stores the condensate, which is generated when the part of the exhaust gas is cooled.

6. The exhaust gas heat exchanger according to claim 1, wherein:
   the system further includes a cooling heat exchanger that is located downstream of the compressing means to cool the compressed intake air-gas mixture, which is compressed by the compressing means;
   the cooled intake air-gas mixture, which is cooled by the cooling heat exchanger, is introduced to the internal combustion engine; and
   the part of the exhaust gas discharged from the internal combustion engine flows into the intake air-gas mixture at the merge part.

7. The exhaust gas heat exchanger according to claim 6, wherein:
   the cooling heat exchanger for cooling the intake air-gas mixture is made of aluminum.

8. The exhaust gas heat exchanger according to claim 1, wherein:
   the heat exchanging member includes an outer tube and an inner tube that is inserted into the outer tube; and
   the outer tube and the inner tube define therebetween the internal passage, through which the part of the exhaust gas flows.

9. The exhaust gas heat exchanger according to claim 1, wherein:
   the intake air-gas mixture flows through the inflow pipe in a first direction; and
   the part of the exhaust gas flows through the heat exchanging member in a second direction opposite from the first direction.

* * * * *

UNITED STATES PATENT AND TRADEMARK OFFICE
CERTIFICATE OF CORRECTION

PATENT NO. : 7,607,301 B2
APPLICATION NO. : 11/501530
DATED : October 27, 2009
INVENTOR(S) : Harada et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 82 days.

Signed and Sealed this

Twelfth Day of October, 2010

David J. Kappos
*Director of the United States Patent and Trademark Office*